United States Patent [19]
Diggins

[11] Patent Number: 5,137,372
[45] Date of Patent: Aug. 11, 1992

[54] SPHERICAL FLUID BEARING APPARATUS
[75] Inventor: Paul E. Diggins, Bellflower, Calif.
[73] Assignee: Rockwell International Corporation, Seal Beach, Calif.
[21] Appl. No.: 662,096
[22] Filed: Feb. 28, 1991
[51] Int. Cl.⁵ .......................... F16C 32/06; G09B 9/08
[52] U.S. Cl. ..................................... 384/108; 434/34; 384/12; 384/100; 384/109
[58] Field of Search ................. 384/72, 100, 108, 109; 434/34, 37, 55, 58

[56] References Cited
U.S. PATENT DOCUMENTS

| | | | |
|---|---|---|---|
| H174 | 12/1986 | Mermager | 384/100 X |
| 2,695,199 | 11/1954 | Blizard | 384/109 |
| 2,710,234 | 6/1955 | Hansen | 384/109 |
| 3,135,057 | 6/1964 | Nelson et al. | 434/34 |
| 3,321,979 | 5/1967 | Blazek et al. | 384/100 X |
| 3,351,394 | 11/1967 | Hooker | 384/108 X |
| 3,449,843 | 6/1969 | Richter et al. | 434/34 |
| 3,611,785 | 10/1971 | Hanson | 384/109 X |

Primary Examiner—Thomas R. Hannon
Attorney, Agent, or Firm—Lawrence N. Ginsberg; Charles T. Silberberg

[57] ABSTRACT

The apparatus comprises at least one spherically segmented bearing assembly arranged about the periphery of the device so as to maintain the center of rotation of the device within the assembly coincident with the center of mass of the device. A fluid source provides fluid to the spherically segmented bearing assemblies.

25 Claims, 5 Drawing Sheets

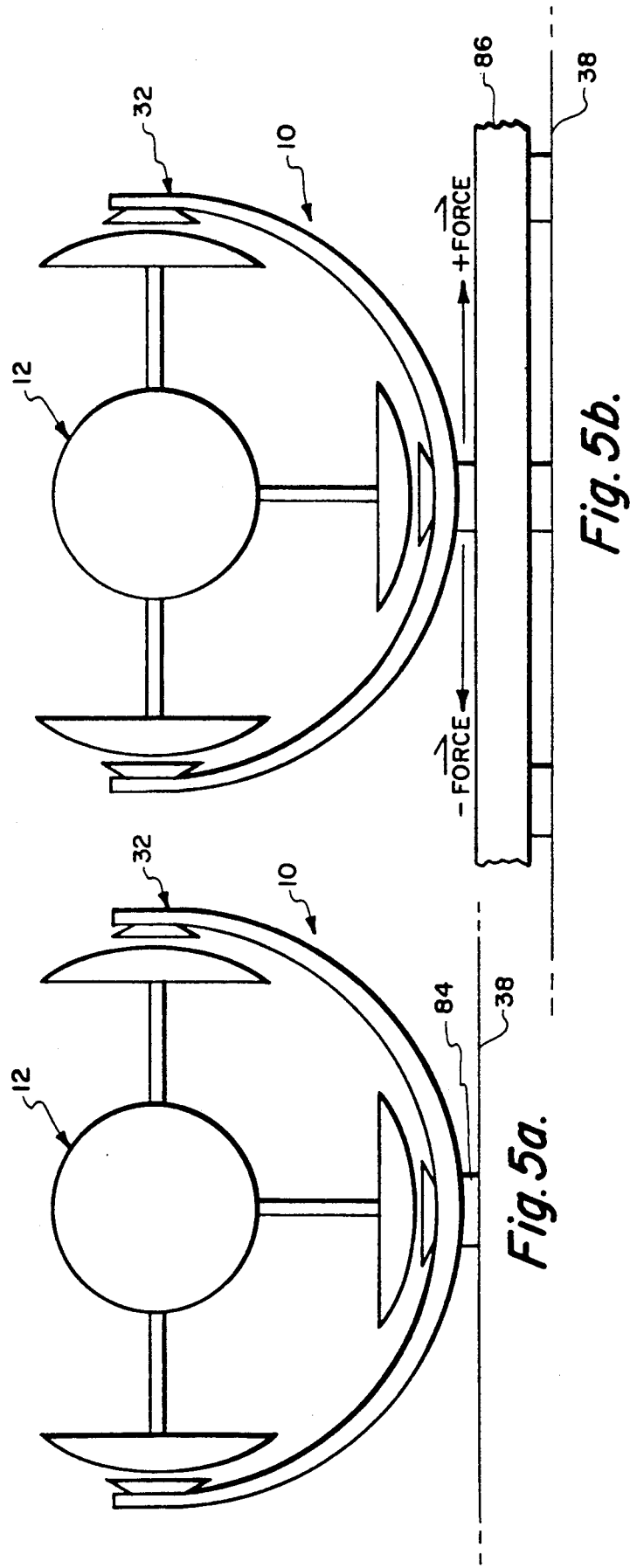

SPHERICAL FLUID BEARING APPARATUS

BACKGROUND OF THE INVENTION

1. Field of the Invention

This invention relates to fluid bearings and more particularly to a spherical fluid bearing apparatus for freely supporting a device on an apparatus support surface.

2. Description of the Related Art

Ground testing of space flight vehicles is generally limited to three options. A first option is suborbital hot fire flight testing. The second option is the use of computer simulated models for testing flight dynamics. A third option is the use of a spherical air bearings mounted at the center of the vehicle's center of mass.

Hot fire testing is very expensive and typically results in the consumption of the flight vehicle. Computer simulated modeling may not be entirely effective because the hardware itself is not tested. The third option, involving use of an air bearing at the center of mass of the vehicle, requires removing essential parts of the vehicle that are currently located at the vehicle's center of mass.

U.S. Pat. No. 3,135,057, issued to G. A. Nelson et al., entitled "Flight Simulator", discloses a spherical shell-like device adapted to subject a human being to rotation flight control problems which may be encountered in space flight. The simulator consists of a hollow sphere mounted on an air-bearing pedestal or the like for rotation about three axes having a normal relation with respect to each other.

Nelson's requirement of encompassing the test device (i.e. in his case a human subject) in a hollow sphere results in a substantial weight change to the device. Furthermore, utilization of a sphere as part of the test simulator prevents use of any thrusters during testing which may be located on the outer surface of the test device. For the above reasons, the Nelson device provides diminished results.

U.S. Pat. No. 2,695,199, issued to R. B. Blizard, entitled "Bearing", discloses a bearing for freely supporting a sensitive element. The bearing comprises a cup, a spherical surface on the sensitive element resting in the cup, means for introducing lubricant between the spherical surface and the cup and points above the bottom and below the top of the cup, and means for withdrawing lubricant from the bottom of the cup.

The bearing disclosed by Blizard would not be effective as a bearing for use in testing flight vehicles because the center of mass of the sensitive element in that case is not disposed coincident with the spherical surface center of rotation.

Accurate simulation of flight vehicles requires center of rotation to occur at the center of mass of the flight vehicle. Currently, such a disposition has been achieved by hot fire testing or use of the spherical bearing at the center of the flight vehicle. The prior art does not allow for free rotation of an assembled flight vehicle device without replacing parts at the center of mass of the device with a spherical bearing or by adding substantial weight to the device.

OBJECTS AND SUMMARY OF THE INVENTION

It is, therefore, a principal object of the present invention to provide universal rotation of the test device about its center of mass with minimal change in the test device's initial pre-testing properties.

Another object is to provide such a universal rotation in combination with linear translations.

These and other objects are achieved by the present invention which is a spherical fluid bearing apparatus for freely supporting a device. In its broadest aspects, the apparatus comprises at least one spherically segmented bearing assembly arranged about the periphery of the device so as to maintain the center of rotation of the device within the assembly coincident with the center of mass of the device. A fluid source provides fluid to the spherically segmented bearing assemblies.

The spherical fluid bearing apparatus of the present invention is particularly adaptable for use as a flight dynamic simulator for a three-axis stabilized flight vehicle. The spherically segmented bearing assembly includes a spherically segmented fluid supply pad and an opposing complimentary spherically segmented reaction pad. In one embodiment, the spherically segmented reaction pad assembly is rigidly attached to the device being tested. In this instance, the opposing spherically segmented fluid supply pad is attached to a cradle assembly which is supported on a support surface.

In another embodiment, the spherically segmented fluid supply pad is rigidly attached to the device being tested and the opposing spherically segmented reaction pad is attached to a cradle assembly which is supported on the support surface. In both instances, a fluid source is provided to supply a fluid, preferably air, to the appropriate fluid supply pads.

Other objects, advantages and novel features of the present invention will become apparent from the following detailed description of the invention when considered in conjunction with the accompanying drawings.

BRIEF DESCRIPTION OF THE DRAWINGS

FIG. 4b is a side view of the reaction pad of FIG. 4a.

FIG. 5a is a schematic illustration of the spherical fluid bearing apparatus of the present invention rigidly affixed to an apparatus support surface.

FIG. 5b is a schematic illustration of the spherical fluid bearing apparatus supported on a linear bearing assembly for providing linear movement relative to an apparatus support surface.

DETAILED DESCRIPTION OF THE PREFERRED EMBODIMENTS

Figure 1:
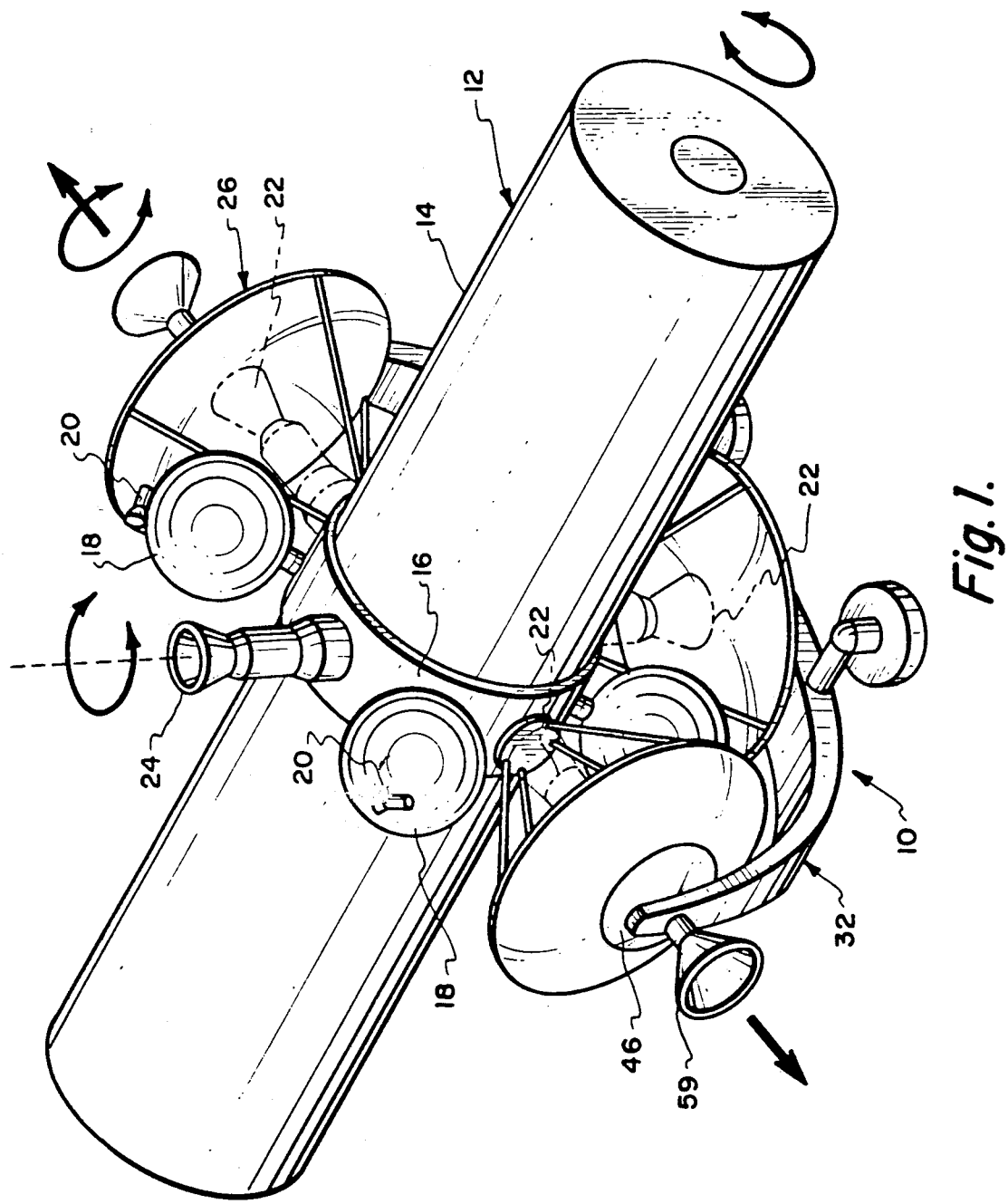
FIG. 1 is a perspective view of the spherical fluid bearing apparatus of the present invention shown supporting a three-axis stabilized flight vehicle.

Referring now to the drawings and the characters of reference marked thereon, FIG. 1 illustrates a preferred embodiment of the spherical fluid bearing apparatus, designated generally as 10, supporting a three-axis stabilized flight vehicle, designated generally as 12. It is understood that this particular type of flight vehicle 12 is shown by way of illustration and not limitation.

Figure 2:
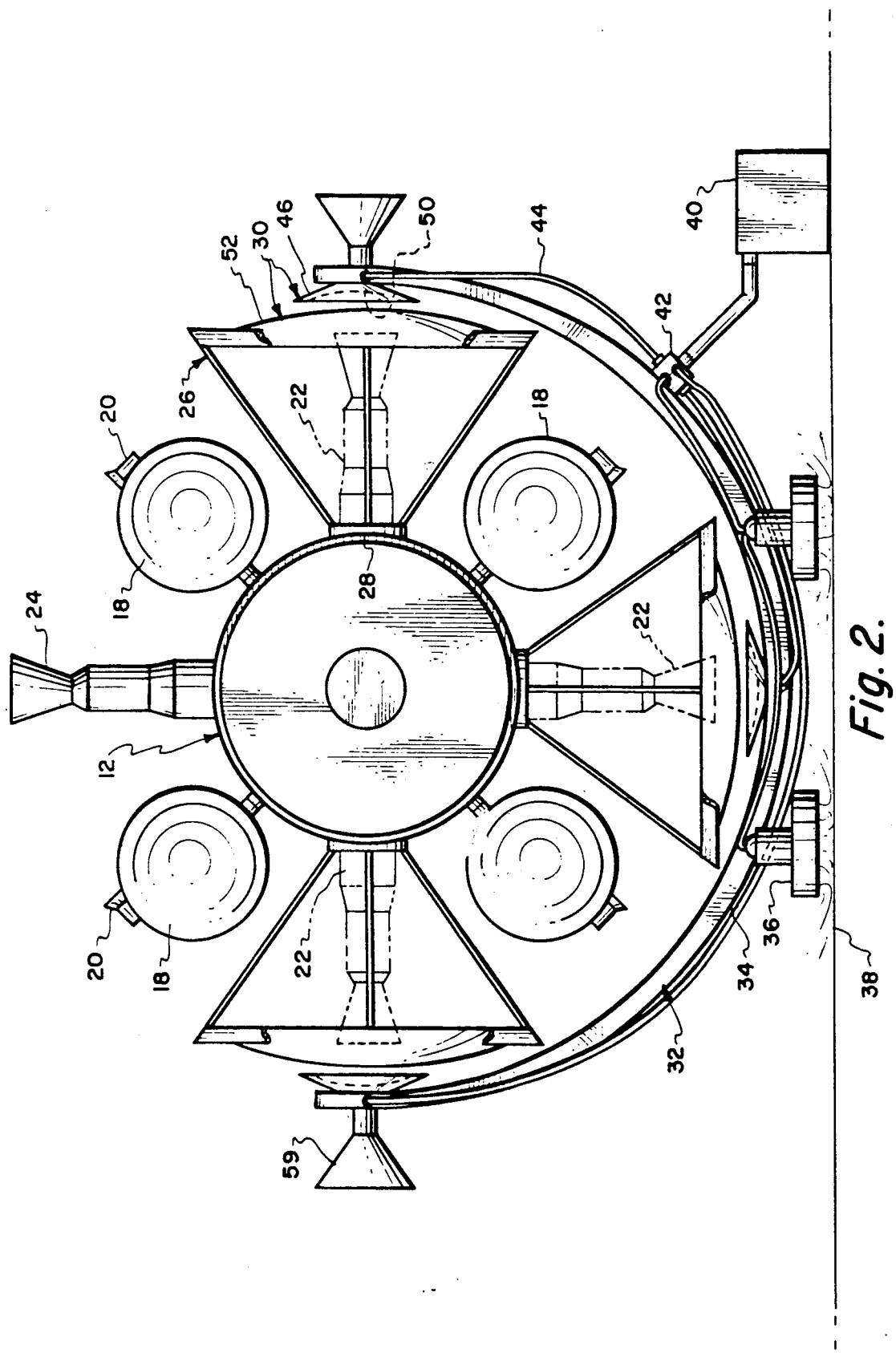
FIG. 2 is an end view of the bearing apparatus and the flight vehicle supported therein which is illustrated in FIG. 1.

By way of background, flight vehicle 12 includes a central housing 14 for supporting avionics and various subsystems. The vehicle 12 includes a centrally disposed propellent manifold/primary structure 16. Spherical propellent tanks 18 are mounted to the primary structure 16. As can be seen in FIG. 2, the flight vehicle 12 includes four radially disposed propellent tanks 18. Relatively small attitude control thrusters 20 are mounted on respective propellent tanks 18 to provide rotation to the flight vehicle 12. Engine commands to attitude control thrusters 20 are provided by the avionics and the flight test vehicle 12.

Transfer accelerations for the flight test vehicle 12 are provided by four divert thrusters. These divert thrusters are not being tested by the present invention. Thus, in FIGS. 1 and 2, three of the divert thrusters are illustrated by phantom lines 22. Such a phantom illustration has been made to emphasize that these three divert thrusters are, in fact, removed during simulation. The fourth divert thruster 24 remains intact.

In place of divert thrusters 22, three spherically segmented reaction pad assemblies 26 are mounted to the existing divert thruster attach points 28. Each spherically segmented reaction pad assembly 26 forms one complimentary half of a spherically segmented bearing assembly, designated generally 30, as will be described in detail below.

Apparatus 10 includes a cradle assembly, designated generally as 32. Cradle assembly 32 is a rigid yolk structure. The cradle assembly 32 includes a cradle assembly support means having a cradle 34 and a cradle support member 36. Cradle support member 36 in this instance includes a planar air bearing assembly which is attached to the cradle 34 for freely supporting the apparatus 12 relative to an apparatus support surface 38. As will be described hereafter, the cradle support member 36 may include a linear bearing assembly or may merely be affixed to the apparatus support surface 38.

A fluid source 40, preferably an air supply source, is provided external to the cradle assembly 32. A fluid manifold 42 includes fluid conduits 44 for supplying air to spherically segmented fluid supply pad subassemblies 46 mounted to the cradle 34. Each fluid supply pad subassembly 46 includes a generally concave fluid supply pad 50 with multiple air injection ports. The conduit 44 attaches to the air supply pad 46 by conventional gas fittings. The fluid manifold 42 includes conventional pressure and flow regulation devices. Appropriate air manifold means are provided to supply the linear air bearing assemblies 36.

During operation of the apparatus 10, air is injected between the concave surface 50 of the fluid supply pad subassembly 46 and the convex, opposing complimentary surface 52 of a reaction pad on a reaction pad assembly 26. (It is understood that the gap between these surfaces 50, 52 is exaggerated in FIG. 2 to illustrate the features of the apparatus 10). The provision of the air film in this gap allows free rotation of the device 12 within the spherical fluid bearing apparatus 10. The gap is typically in a range between 0.005 and 0.025 inches.

Arrangement of the spherically segmented bearing assemblies 30 about the periphery of the flight vehicle 12 maintains the center of rotation of the flight vehicle 12 within the assembly 10 coincident with the center of mass of the flight vehicle 12. Furthermore, this arrangement of bearings does not interfere with the flight test vehicle's critical components.

As an added feature, the present invention includes planar air bearing assemblies 36. These air bearings provide free support of the apparatus 10 relative to the surface 38. Planar motion is provided by a plurality of thrust devices 59 mounted to the cradle 34 for providing planar translation in the desired direction along the apparatus support surface 38.

Figure 3C:
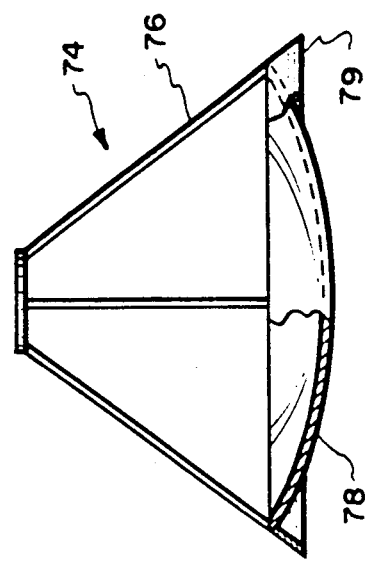
FIG. 3c illustrates another embodiment of a thin-walled reaction pad assembly without a circular plate.
Figure 3B:
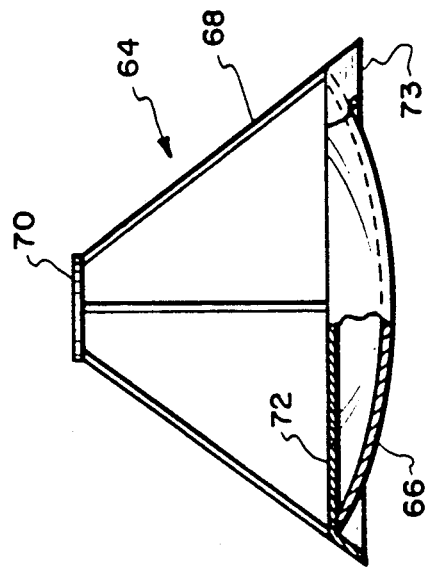
FIG. 3b illustrates a thin-walled spherically segmented reaction pad assembly with a plurality of load bearing trusses and a thin circular plate, the reaction pad assembly being shown in partial cross section.
Figure 3A:
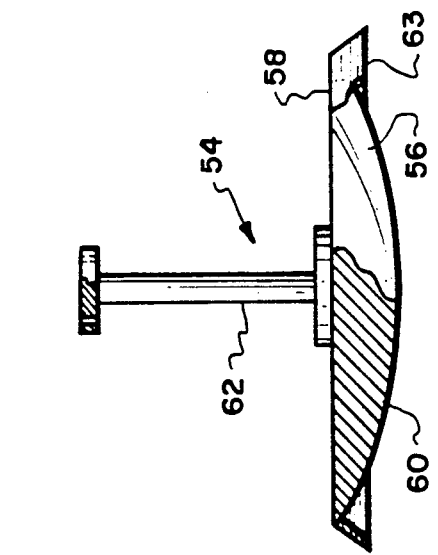
FIG. 3a illustrates a solid reaction pad assembly partially in cross section, of the present apparatus shown supported by a central load bearing column.

Referring now to FIG. 3a, one embodiment, designated generally as 54, of a reaction pad assembly is illustrated. Reaction pad assembly 54 includes a solid, spherically segmented reaction pad 56 having a flat surface 58 and a convex spherical surface 60. A rigid load bearing column 62 is rigidly connected at a first end to a center of the flat surface 58 and at a second end to the device (not shown). Use of such a rigid column 62 provides a simple structural support means and a minimal tolerance build up. A thin strip 63 forms the rotation limit perimeter.

Referring now to FIG. 3b, a second embodiment of a reaction pad assembly is illustrated, designated generally as 64. Reaction pad assembly 64 includes a thin-walled spherically segmented reaction pad 66, a plurality of load bearing trusses 68, and a mounting hub 70 for rigidly attaching the trusses 68 to the device (not shown). The trusses 68 are connected to portions of the outer periphery of the reaction pad 66. The reaction pad 66 also includes a thin circular plate 72 attached to the outer periphery of the reaction pad 66 for providing enhanced rigidity. A thin strip 73 forms the rotation limit perimeter.

Referring now to FIG. 3c, another embodiment of a reaction pad assembly is shown, designated generally as 74. Reaction pad assembly 74, as in the FIG. 3b embodiment, includes a plurality of trusses 76 connected to a thin-walled reaction pad 78. However, this embodiment does not include the thin circular plate 72 of the previous embodiment. In the FIG. 3c embodiment it is assumed that a material of sufficient stiffness is used to fabricate reaction pad 78 thereby obviating the need for a circular plate 72. A thin strip 79 forms the rotation limit perimeter.

Figure 4B:
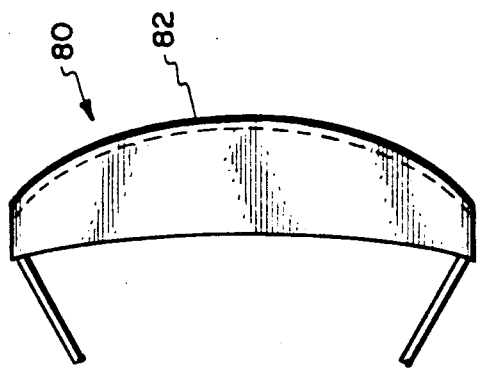
Figure 4A:
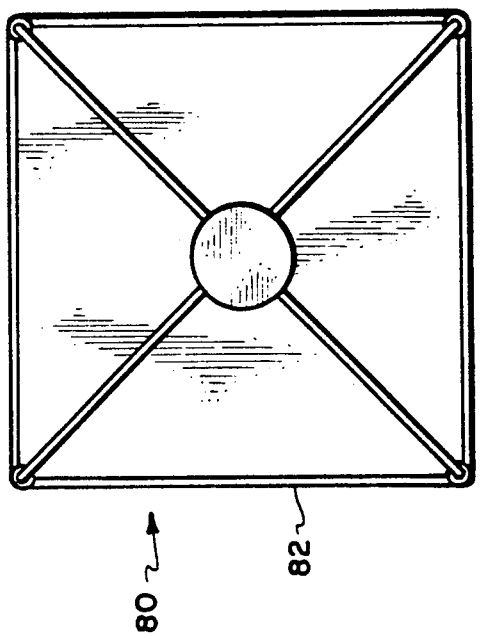
FIG. 4a is a planar view of a reaction pad which appears as a rectangle when projected on an imaginary flat surface.

Referring now to FIG. 4a, yet another embodiment of the reaction pad assembly is shown, designated generally as 80. Assembly 80 includes a reaction pad 82 which is shaped to appear as a rectangle when projected on a imaginary surface. It is understood, however, that this reaction pad assembly 80 is spherically segmented, as were the previous reaction pad embodiments, as shown in its side view of FIG. 4b.

Reaction pads should be formed of a relatively stiff, lightweight material such as 6061-T6 Al or advanced composites such as thermoplastics.

Although the FIG. 1 embodiment illustrates that the apparatus 10 may be supported by an air bearing upon the support surface 38, other options are available. Referring now to FIG. 5a, a schematic illustration is illustrated of an apparatus 10 fixedly secured to an apparatus support surface 38. If only rotation of the device is required for testing, a cradle mounting adapter 84 may be used to fix the apparatus 10.

Referring now to FIG. 5b, another cradle adapter 86 in the form of a commercially available linear bearing assembly, may be attached to the cradle 32 for providing linear motion of the apparatus 10, side-to-side, for example 20 feet or more.

Figure 6:
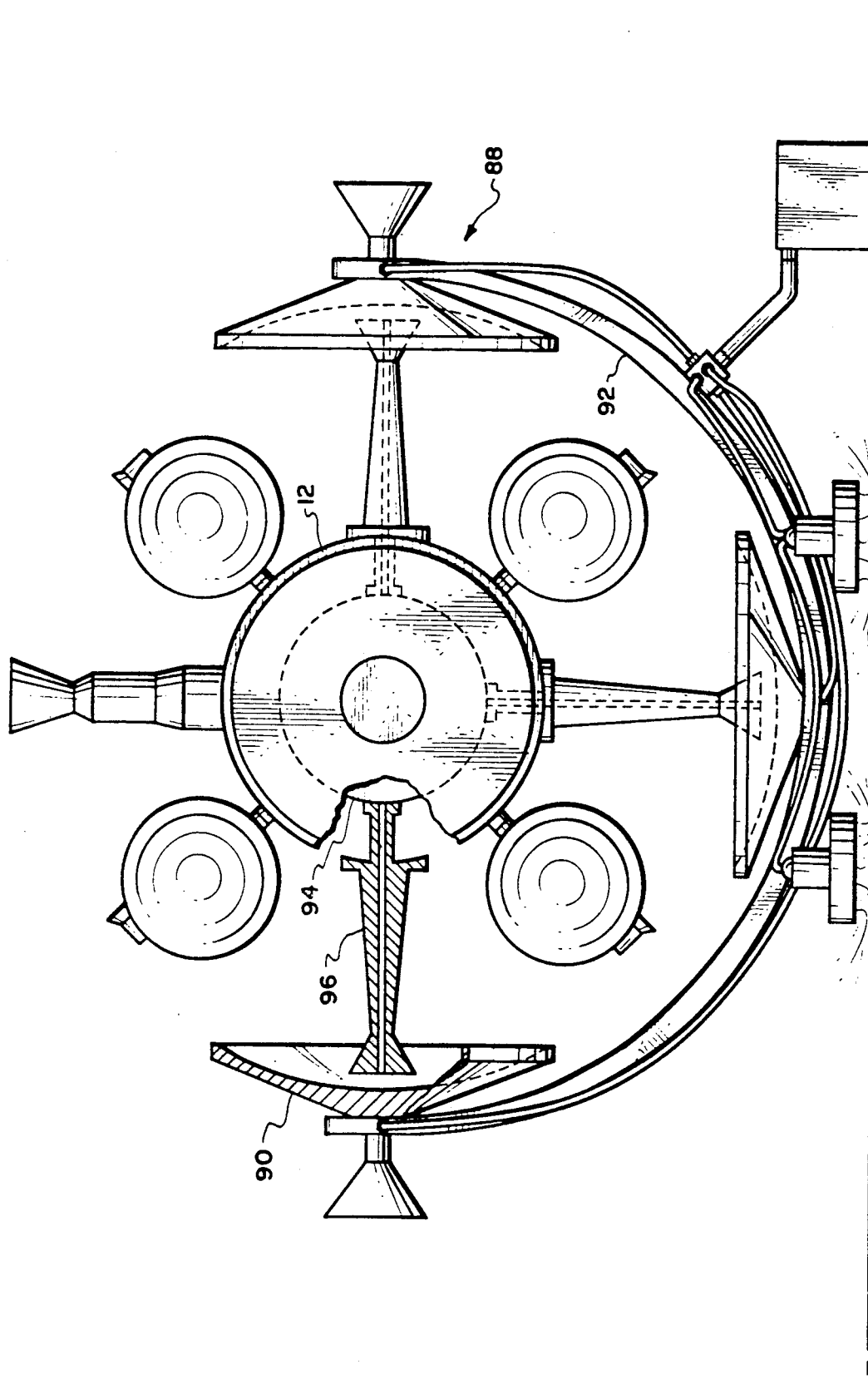
FIG. 6 illustrates a second embodiment of the spherical fluid bearing apparatus in which the reaction pads and fluid supply pads are reversed from the positions of the FIGS. 1 and 2 embodiment.

FIG. 6 illustrates another embodiment of the present invention, designated generally as 88, in which the reaction pads and fluid supply pads are reversed. Apparatus 88 includes cradle assembly support means 92, as illustrated in the embodiment of FIGS. 1 and 2. However, a plurality of reaction pad subassemblies 90 (instead of fluid supply pads) are attached to the cradle assembly support means 92. Fluid is provided from a source 94 in the center of the test device 12. Fluid from source 94 flows through fluid supply pad assemblies 96 which, in this case, are rigidly attached to the device 12. As in the previous embodiment, the reaction pad/fluid supply pad interfaces include spherically segmented portions. This type of set-up is preferable for use with a lighter weight test device than that illustrated in the FIG. 1 embodiment.

Due to low flow of the air supply pads, air may be provided by an external source through flexible conduits (not shown).

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A spherical fluid bearing apparatus for freely supporting a device, comprising:
    (a) a plurality of spherically segmented bearing assemblies forming disconnected bearing surfaces arranged about the periphery of said device so as to maintain the center of rotation of the device within the assembly coincident with the center of mass of said device; and,
    (b) a fluid source for providing fluid to said plurality of segmented bearing assemblies.

2. A spherical fluid bearing apparatus for freely supporting a device on an apparatus support surface, comprising:
    (a) at least one spherically segmented reaction pad assembly rigidly attached to said device;
    (b) a fluid source; and,
    (c) a cradle assembly, including:
        (i) cradle assembly support means for supporting said cradle assembly on said apparatus support surface;
        (ii) at least one spherically segmented fluid supply pad subassembly attached to said cradle assembly support means, each of said at least one fluid supply pad subassembly being so arranged and constructed to oppose a convex surface of an associated reaction pad assembly, each of said at least one fluid supply pad subassembly including fluid conduit means for providing a flow of fluid through said fluid supply pad subassembly and between said convex surface of said associated reaction pad assembly and a concave surface of said fluid supply pad subassembly; and,
        (iii) fluid manifold means for receiving fluid from said fluid source and distributing flows of said fluid to said at least one fluid supply pad subassembly, thereby providing a bearing fluid film between said at least fluid supply pad subassembly and said associated reaction pad assembly and allowing free rotation of said device within said spherical fluid bearing apparatus.

3. The spherical fluid bearing apparatus of claim 2 including:
    a plurality of said reaction pad assemblies, said plurality of reaction pad assemblies being concentrically disposed, and
    an equal plurality of opposing fluid supply pad subassemblies.

4. The spherical fluid bearing apparatus of claim 3 wherein said plurality of reaction pad assemblies includes three reaction pad assemblies.

5. The spherical fluid bearing apparatus of claim 3 including two equidistantly disposed reaction pad assemblies.

6. The spherical fluid bearing apparatus of claim 5 wherein said reaction pad assemblies are disposed on a single plane.

7. The spherical fluid bearing apparatus of claim 2 wherein each of said at least one reaction pad assemblies includes:
    (a) a solid spherically segmented reaction pad having a flat surface and said convex spherical surface, and
    (b) a rigid load bearing column rigidly connected at a first end to a center of said flat surface and at a second end to said device.

8. The spherical fluid bearing apparatus of claim 2 wherein each of said at least one reaction pad assemblies includes:
    (a) a thin walled spherically segmented reaction pad;
    (b) a plurality of load bearing trusses, each truss having a first and a second end, said first ends being connected to portions of the outer periphery of said reaction pad; and
    (c) a mounting hub for securely attaching said second end of said trusses to said device.

9. The spherical fluid bearing apparatus of claim 8 wherein said reaction pad includes a thin circular plate attached to said outer periphery of said reaction pad for providing enhanced rigidity.

10. The spherical fluid bearing apparatus of claim 2 wherein each of said at least one reaction pad assemblies includes:
    a reaction pad being shaped as a rectangle when projected on an imaginary flat surface; and
    reaction pad support means for rigidly supporting said reaction pad on said device.

11. The spherical fluid bearing apparatus of claim 2 wherein said cradle assembly support means includes:
    a cradle; and
    at least one cradle support member for affixing said cradle to said apparatus support surface.

12. The spherical fluid bearing apparatus of claim 2 wherein said cradle assembly support means includes:
    a cradle; and
    a linear bearing assembly attached to said cradle providing linear motion of said spherical fluid bearing apparatus relative to said apparatus support surface.

13. The spherical fluid bearing apparatus of claim 2 wherein said cradle assembly support means includes:
    a cradle; and at least one planar air bearing assembly attached to said cradle for freely supporting said spherical fluid bearing apparatus relative to said apparatus support surface.

14. The spherical fluid bearing apparatus of claim 13, further including a plurality of thrust devices mounted to said cradle for providing planar translation in the desired direction along said apparatus support surface.

15. A spherical fluid bearing apparatus for freely supporting a device on an apparatus support surface, comprising:
  (a) a cradle assembly, including:
    (i) cradle assembly support means for supporting said cradle assembly on said apparatus support surface; and
    (ii) at least one spherically segmented reaction pad subassembly attached to said cradle assembly support means;
  (b) a fluid source; and,
  (c) at least one spherically segmented fluid supply pad assembly rigidly attached to said device, each of said at least one fluid supply pad assembly being so arranged and constructed to oppose a concave surface of an associated reaction pad subassembly, each of said at least one fluid supply pad assembly including fluid conduit means for providing a flow of fluid through said fluid supply pad assembly and between said concave surface of said associated reaction pad assembly and a convex surface of said fluid supply pad subassembly; and,
  (d) fluid manifold means for receiving fluid from said fluid source and distributing flows of said fluid to said at least one fluid supply pad assembly, thereby providing a bearing fluid film between said at least one fluid supply pad assembly and said associated reaction pad subassembly and allowing free rotation of said device within said spherical fluid bearing apparatus.

16. The spherical fluid bearing apparatus of claim 15 including:
  a plurality of said reaction pad subassemblies, said plurality of reaction pad subassemblies being concentrically disposed, and
  an equal plurality of opposing fluid supply pad assemblies.

17. The spherical fluid bearing apparatus of claim 16 wherein said plurality of reaction pad subassemblies includes three reaction pad subassemblies.

18. The spherical fluid bearing apparatus of claim 16 including two equidistantly disposed reaction pad subassemblies.

19. The spherical fluid bearing apparatus of claim 18 wherein said reaction pad subassemblies are disposed on a single plane.

20. The spherical fluid bearing apparatus of claim 15 wherein each of said at least one reaction pad subassemblies includes:
  a reaction pad being shaped as a rectangle when projected on an imaginary flat surface; and
  reaction pad support means for rigidly supporting said reaction pad on said device.

21. The spherical fluid bearing apparatus of claim 15 wherein said cradle assembly support means includes:
  a cradle; and
  at least one cradle support member for affixing said cradle to said apparatus support surface.

22. The spherical fluid bearing apparatus of claim 15 wherein said cradle assembly support means includes:
  a cradle; and
  a linear bearing assembly attached to said cradle providing linear motion of said spherical fluid bearing apparatus relative to said apparatus support surface.

23. The spherical fluid bearing apparatus of claim 15 wherein said cradle assembly support means includes:
  a cradle; and
  at least one planar air bearing assembly attached to said cradle for freely supporting said spherical fluid bearing apparatus relative to said apparatus support surface.

24. The spherical fluid bearing apparatus of claim 23, further including a plurality of thrust devices mounted to said cradle for providing planar translation in the desired direction along said apparatus support surface.

25. A flight dynamic simulator for a three-axis stabilized flight vehicle, comprising:
  (a) a plurality of spherically segmented bearing assemblies forming disconnected bearing surfaces arranged about the periphery of said flight vehicle so as to maintain the center of rotation of the flight vehicle within the assembly coincident with the center of mass of said flight vehicle; and
  (b) a fluid source for providing fluid to said plurality of segmented bearing assemblies.

* * * * *